April 30, 1935.   C. STERN   1,999,643
DRIFTING VALVE FOR LOCOMOTIVES
Filed May 22, 1933   5 Sheets-Sheet 1
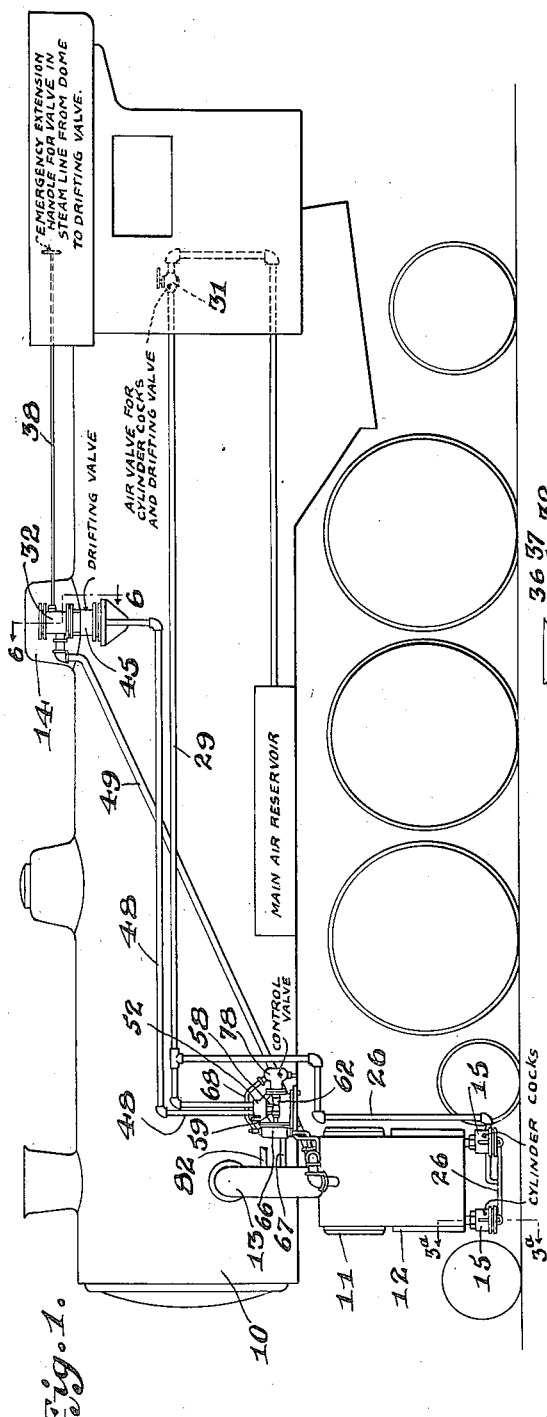
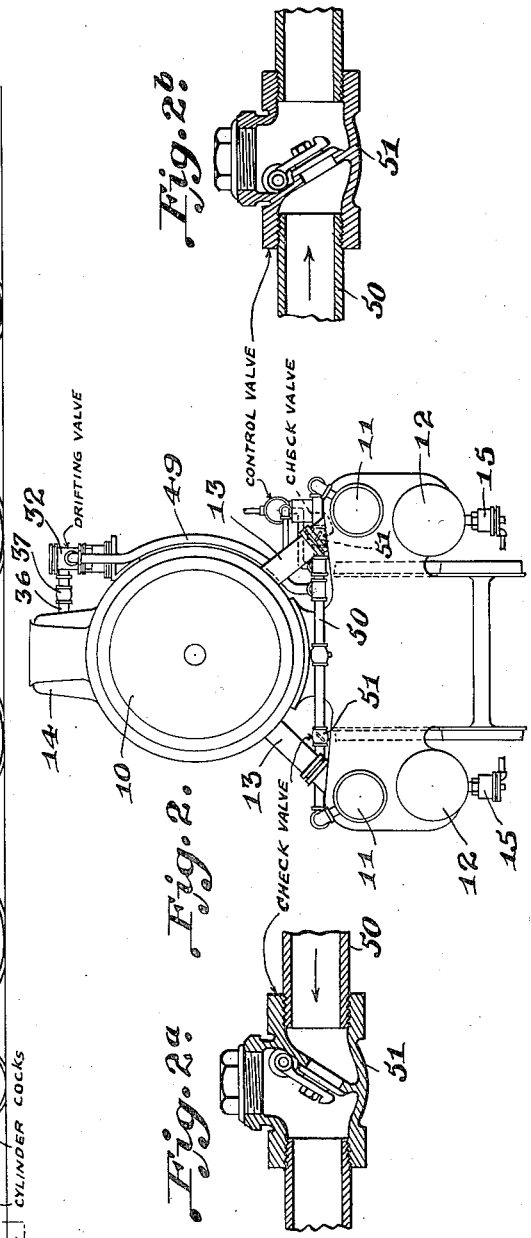
Inventor
Charles Stern
By Bawhinney & Bawhinney
Attorneys

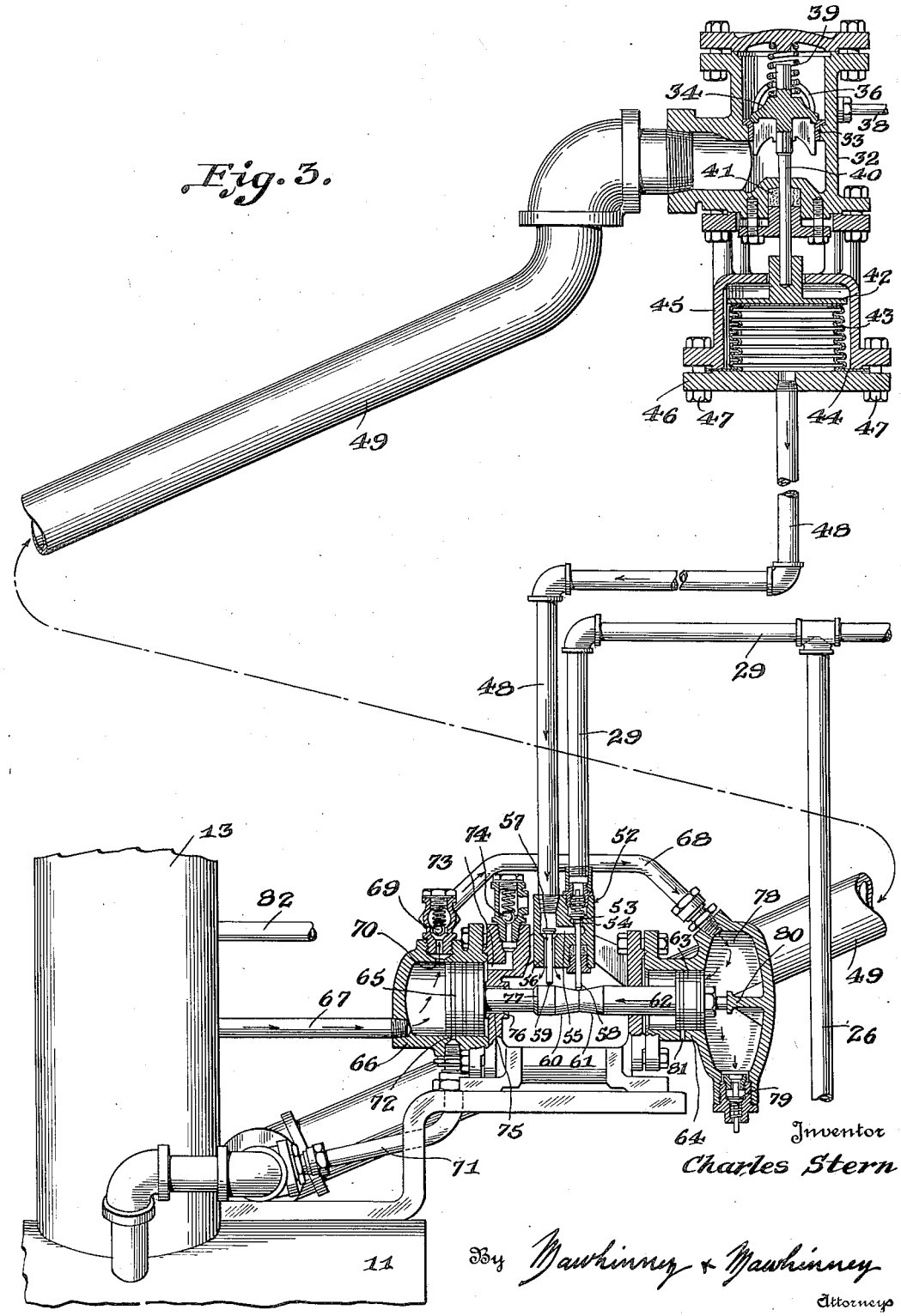

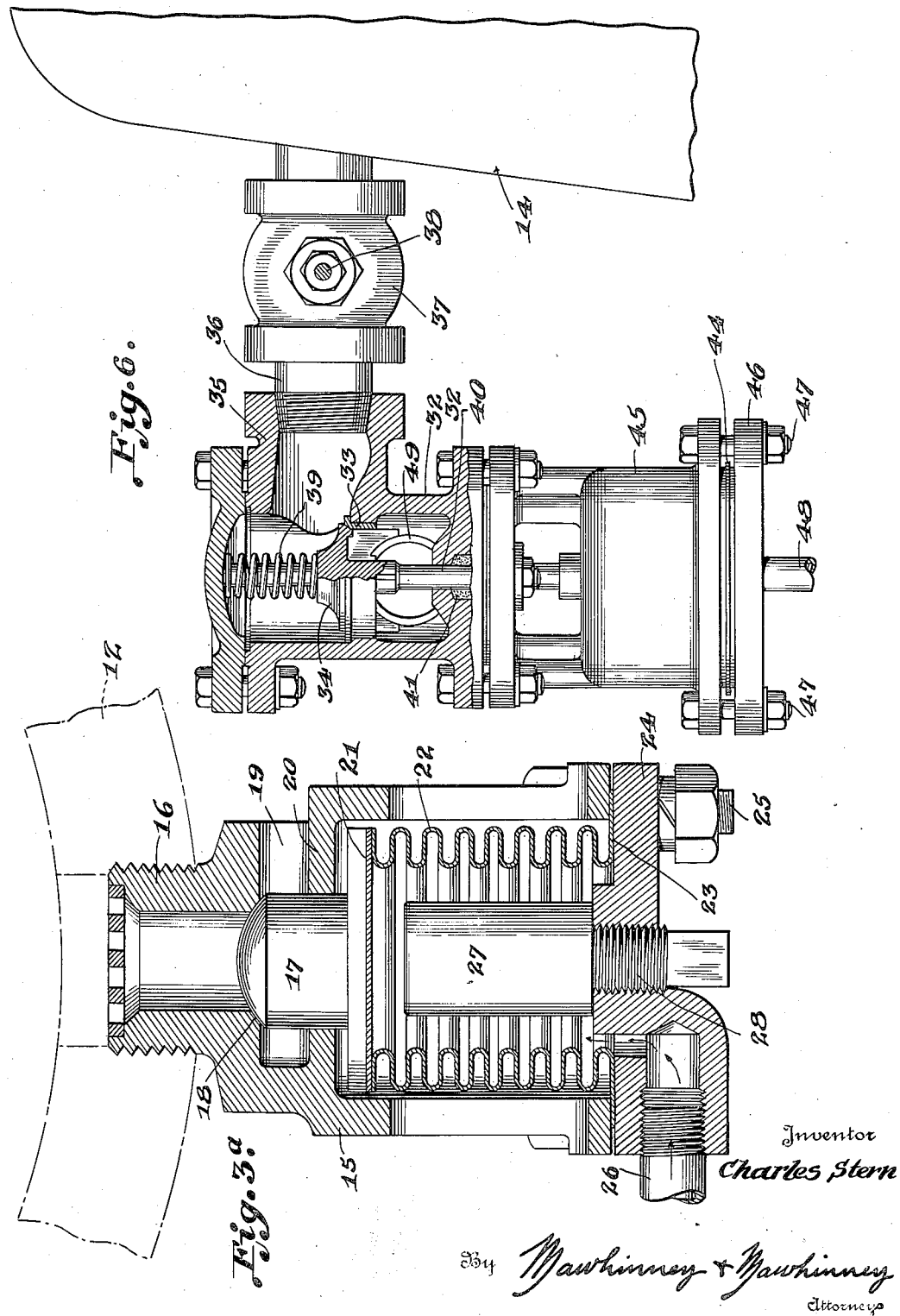

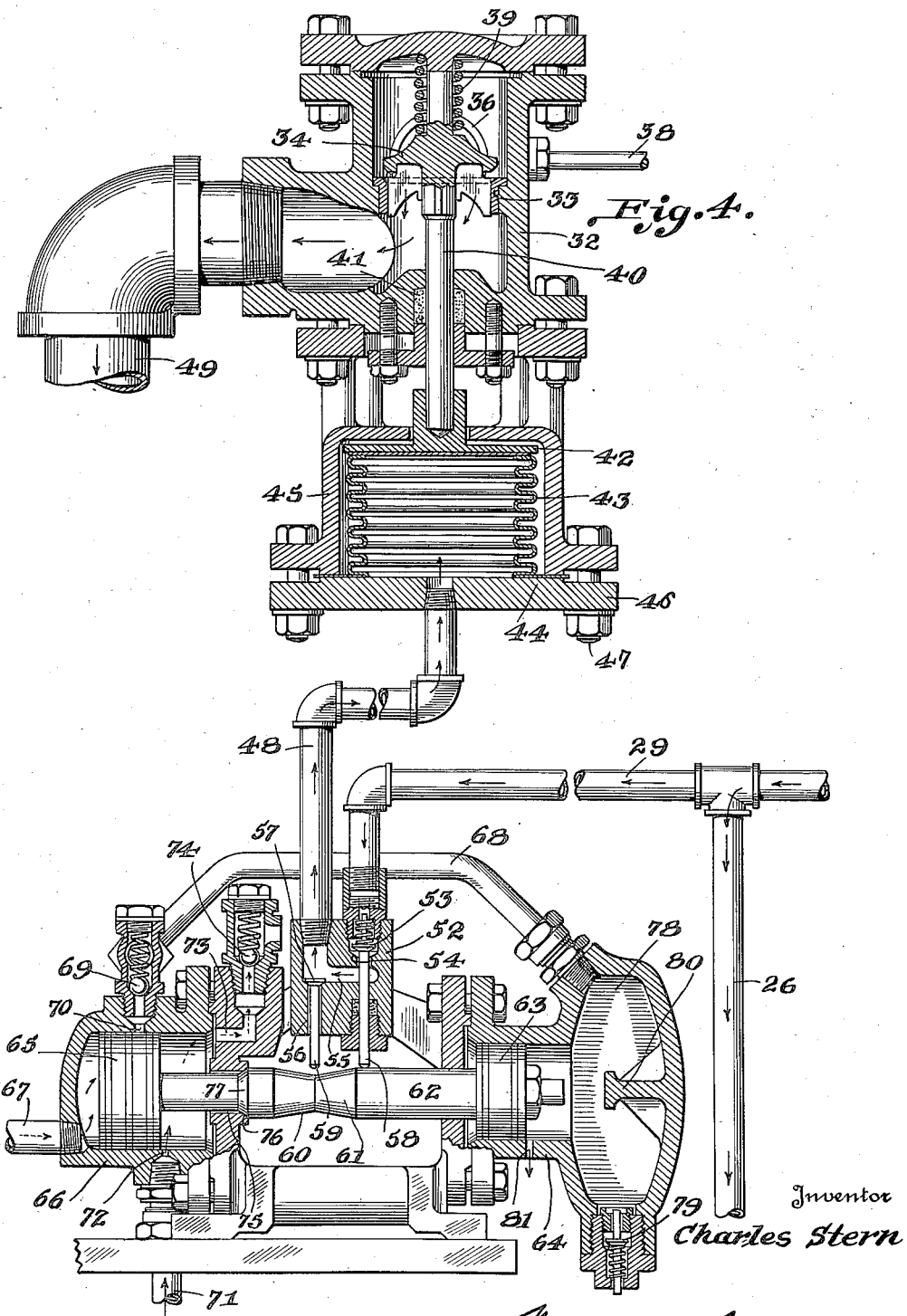

April 30, 1935.　　　C. STERN　　　1,999,643
DRIFTING VALVE FOR LOCOMOTIVES
Filed May 22, 1933　　　5 Sheets-Sheet 5

Inventor
Charles Stern

By Mawhinney & Mawhinney
Attorneys

Patented Apr. 30, 1935

1,999,643

UNITED STATES PATENT OFFICE 1,999,643

DRIFTING VALVE FOR LOCOMOTIVES

Charles Stern, Jersey City, N. J., assignor to Ardco Manufacturing Company, Hoboken, N. J., a corporation of Delaware Application May 22, 1933, Serial No. 672,340

12 Claims. (Cl. 121—137)

The present invention relates to improvements in drifting valves for locomotives, and has for an object certain improvements over the devices shown and described in my prior two co-pending applications entitled, respectively, Lubricator controlled drifting valve for locomotives, filed August 24, 1932, Serial No. 630,307, and Governor controlled drifting valves for locomotives, filed September 29, 1932, Serial No. 635,445.

In common with the objects of these prior inventions and applications, the present invention contemplates an improved drifting valve which will assure the delivery of an adequate amount of boiler steam to the locomotive steam chests and cylinders as soon as, and throughout the time that, the throttle is closed and the locomotive permitted to drift, in order that the proper lubrication and moisture may be supplied to the valves and pistons, that vacuum in the cylinders may be eliminated and to the end that the other advantages of supplying drifting valve steam to the locomotive steam chest and cylinders may be had.

The present invention relates more particularly to an improved form and construction of control valve for regulating the opening and closing of the drifting valve, such control valve being positive and reliable in its action and being of simple construction in which the parts are such as to have long life and not easily get out of order.

The invention also has for an object to provide an improved form of the drifting valve in which the valve will open and close reliably and quickly in response to its actuating medium, which is compressed air in the instance shown in the drawings.

A further object of the invention is a joint operating hook-up of the cylinder cocks and drifting valve whereby when the cylinder cocks are closed the drifting valve will be placed in a potential position for the opening and closing of a supply of boiler steam to the locomotive valve chests and cylinders. This combination completely eliminates the possible human neglect to open and shut the drifting valve.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a diagrammatic side view of a locomotive shown equipped with an improved drifting valve system constructed in accordance with the present invention.

Figure 2 is a front view of the same.

Figures 2a and 2b are sections of check valves.

Figure 3 is an enlarged sectional view of the drifting and control valves in position when the locomotive is moved under full steam and when at rest.

Figure 3a is a vertical sectional view of a cylinder cock in closed position.

Figure 4 is a view similar to Figure 3 taken on an enlarged scale showing the position of the parts when the throttle is closed and the locomotive drifting.

Figure 6 is a section taken on the line 6—6 in Figure 1.

Figure 5:
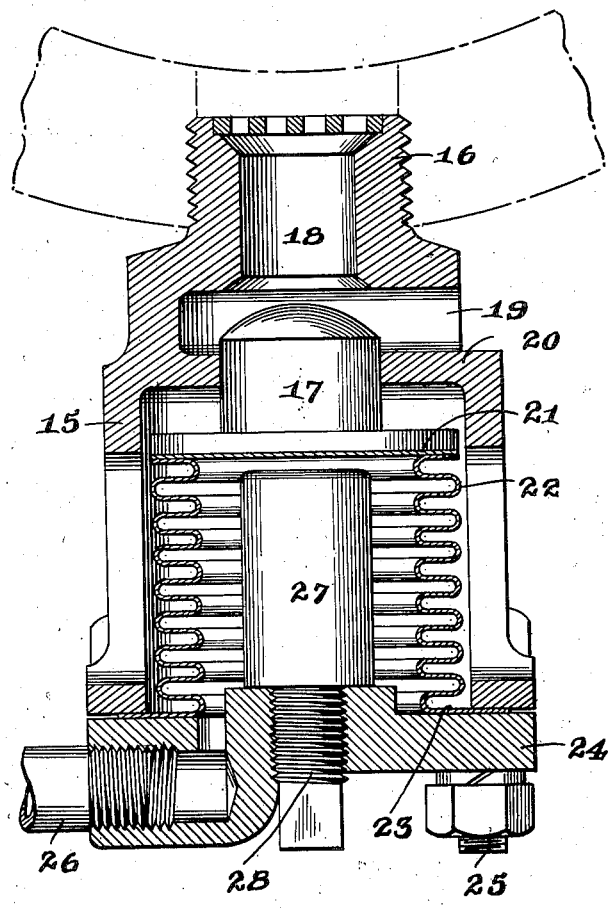
Figure 5 is a vertical section of one of the cylinder cocks in the open position.

Referring more particularly to the drawings, 10 designates generally a locomotive having the locomotive steam chests 11 and the locomotive cylinders 12. Figure 1 shows main air reservoir connected to valve 31 in cab, and this valve is connected to pipe 29 which is in communication with inlet valve 53 in air valve casing 52, Figures 3—4. The air chamber 55 beneath the inlet valve 53 communicates freely with the pipe 48 which leads to the cover plate 46 of drifting valve 32 for supplying air to interior of bellows 43 (Figures 3—4). A branch pipe 26 leading from pipe 29 communicates with the cylinder cocks 15 as shown in Figures 1—2.

Figure 1 shows drifting valve 32 attached to locomotive steam dome 14 with standard globe valve 37 connected between dome 14 and valve opening 35, as shown in Figure 6. An emergency extension handle 38 connected to valve 37 extends into locomotive cab. Pipe 49 connects to drifting valve 32 and to cross pipes 50 leading to and communicating with both of the locomotive steam chests 11. In the pipe 50 are check valves 51 for preventing the steam chest pressure from getting back into the pipe 49 as shown in Figure 2. Pipe 71 leading from cross pipe 50 also connects to port 72 in the large cylinder 66 of control valve as shown in Figures 3—4. Figure 1 also shows locomotive steam pipe 13 to which is connected pipe 67 leading to large cylinder 66 of control valve, as shown more clearly in Figures 3—4.

Superheated steam is supplied to the steam chests 11 through the steam pipes 13 whenever the throttle valve is open. The steam dome is shown at 14 and the drifting valve is indicated as being connected to this steam dome for the purpose of receiving steam at boiler pressure therefrom.

The cylinder cocks are mounted as usual in the lower portions of the ends of the locomotive cylinders 12 and such cylinder cocks are shown in Figures 3a and 5.

The cylinder cock bodies or casings are represented at 15 and the same are provided with threaded shanks 16 for screwing into the threaded sockets in the locomotive cylinders 12. The cylinder cocks are provided with valves 17 adapted to close upwardly against valve seats 18. Below the valve seats 18 are blow-off vents or passages 19 and below such passages are diaphragms 20 through which the valve members 17 reciprocate. Such valve members are carried upon plates 21 resting on the upper portions of bellows 22 which are free to expand and contract within the casing 15, such casing being preferably freely vented to the atmosphere so as to allow free atmospheric pressure to bear at all times upon the pleats or convolutions of the bellows 22. The lower portion of the bellows contains a flange ring 23 extending beneath the casing 15 and clamped against the casing by head 24 through the use of bolts 25. The compressed air pipe 26 communicates with the interior of the bellows, as shown by the arrows in Figure 3a.

The stop bolt 27 is adapted to be moved up to permanently close the valve 17 should the bellows become ruptured or should the device get out of order for any reason. The stop bolt 27 is formed with an integral reduced screw plug 28 threaded adjustably into the head plate 24 and having a lower exposed polygonal end to which a wrench may be attached for securing the plug and the stop bolt up and down.

Figure 3a shows by the arrows that compressed air is being let into the bellows with the effect that the bellows 22 is expanded and the valve 17 closed against its valve seat 18. This is the normal running position of the parts as will be well understood.

Figure 5 shows that the bellows is evacuated of air pressure and that the steam pressure within the locomotive cylinder 12 has forced the valve 17 downwardly off its seat, permitting of the evacuation of the condensation through the lateral port 19.

As shown in Figure 1 the air pipes from the main air reservoir to the drifting valves are shown at 29 and 26, such pipe 29 passing through the cab and having a control valve or cock 31 through which the engineer controls the opening and closing of the cylinder cocks.

When the air control valve 31 is open air from the main air reservoir of the locomotive flows through the pipes 29 and 26 and into the bellows 22 of the various cylinder cocks raising the valves 17 to a closed position, as shown in Figure 3a.

The drifting valve is shown more particularly in Figures 3, 4 and 6 and consists of a casing 32 having a valve seat 33 therein against which the valve member 34 is adapted to close downwardly under the influence of steam from the boiler which has free access to the chamber above the valve member 34 through the lateral connection 35, shown in Figure 6, and the pipe 36 which connects directly with the steam dome 14 of the locomotive.

A valve 37 is shown in the pipe 36. This valve is at all times open to allow steam from the dome 14 free access to the valve chamber. As shown in Figure 1 an emergency rod and handle 38 extend from the valve 37 into the cab. Should any damage occur to the drifting valve, the engineer may close the emergency valve 37, thus preventing leakage of boiler steam from the dome through the broken drifting valve; or this emergency valve 37 may be closed whenever the drifting valve is in any way incapacitated from operation.

Steam pressure will seat the drifting valve 34 but it is also preferred to employ a coil spring 39 for bearing upon the valve body 34 tending to bias it to a closed position upon the valve seat 33.

The valve stem 40 extends down through the stuffing box 41 and fits in a socket of top plate 42 which rests on bellows 43. The lower end of bellows 43 has a permanently attached ring flange 44 which extends beneath the bellows housing or casing 45, and a bottom cover plate 46 clamps this ring flange 44 against the casing by means of bolts or other fastenings 47. This particular type of construction forms an air tight expansion chamber and eliminates any possibility of air leaks and the need for lubrication required with pistons and rings. Compressed air is let into the bellows through pipe 48.

Below the drifting valve member 34 a steam delivery pipe 49 connects with the valve casing. As shown in Figure 2 this pipe 49 is joined at the forward portion of the locomotive with a cross pipe 50 leading to and communicating with both of the locomotive steam chests 11. In the pipe 50 are check valves 51 for preventing the steam chest pressure from getting back into the pipe 49.

The control valve shown more particularly in Figures 3, 4 and 5 includes an air valve casing 52 having an air closed inlet valve 53 in communication with the air pressure pipe 29 and adapted to close downwardly against a seat 54.

The air chamber 55 beneath the inlet valve communicates freely with the pipe 48 leading to the sylphon bellows. Communicating with the passage 55 is an exhaust port 56 normally closed by a valve 57 which seats downwardly as shown in Figure 4 and is normally seated by the pressure of air in the chamber 55 when locomotive is drifting.

The stems 58 and 59 of the valves 53 and 57 project below the air valve casing and into the path of conical or cam sections 60 and 61 on a piston rod 62. This piston rod 62 carries differential pistons at its end portions, the smaller piston 63 in a cylinder 64 of equal size, and a large piston 65 in the large cylinder 66 being both disposed to reciprocate in their respective cylinders. The larger cylinder 66 at its outer end communicates by pipe 67 with the locomotive steam pipe 13 so that superheated steam pressure has access to the outer side of the larger piston 65 at all times while the throttle is open. A by-pass pipe 68 connects the outer portions of the small and larger cylinders 64 and 66 and chamber 78, such pipe containing a spring-pressed check valve 69 opening toward the smaller cylinder and chamber to prevent back flow from the smaller cylinder and chamber to the larger cylinder. The port 70 leading to the check valve 69 and by-pass 68 is in the side wall of the cylinder 66 adapted to be masked by the piston 65 when in the position shown in Figure 4 and only uncovered when the piston 65 is in the extreme inner or right hand position illustrated in Figure 3.

A pipe 71 leading from the cross pipe 50 also connects through a port 72 with an intermediate portion of the larger cylinder 66 in position to be uncovered by the piston 65 when it moves over to the position shown in Figure 4.

The inner end of the larger cylinder 66 is in communication with a port 73 having a spring loaded check valve 74. The load upon this valve 74 can be adjusted whereby the valve will open on the presence of predetermined pressure in the inner portion of the larger cylinder 66 when in drifting position, as shown in Figure 4.

The piston rod 62 has a loose fit through the inner head of the larger cylinder 66 as indicated at 75 and such head is provided with a valve seat 76 for receiving a valve 77 formed on piston rod 62. Communicating with the outer side of the smaller cylinder 64 is a pressure chamber 78 in the lower portion of which is a condensation check valve 79 and in the intermediate portion thereof is an abutment 80 for the piston rod 62. The small cylinder 64 has a port to atmosphere indicated at 81 which is in an intermediate portion of the cylinder to be uncovered by the piston 63 when it moves over to the extreme left position, as shown in Figure 4. At 82 in Figure 1 is shown the oil line from the lubricator.

In the operation of the device the drifting valve is operated by air pressure from the main air reservoir through the pipes 29 and 48 through the medium of the control valve and the opening and closing of the cylinder cocks.

The operation with the throttle open and the cylinder cocks closed is as follows:—

When the cylinder cocks are closed, such closing is accomplished by opening the air valve 31 in the cab and admitting air to the pipes 29 and 26. The air pressure in the pipe 29 keeps the air inlet valve 53 closed and the high point of the cam 60 on the piston rod 62 holds the air exhaust valve 57 open, as shown in Figure 3. In this position the drifting valve 34 is closed inasmuch as no air pressure is allowed access to the bellows 43. The control valve is held in the position, shown in Figure 3, by superheated steam pressure passing from the locomotive steam pipe 13 through pipe 67 to the outer face of the larger piston 65. In this position the larger piston 65 has uncovered the port 70 but masks the port 72 which is offset to the right from the port 70. Therefore the superheated steam may pass up through the port 70, opening the check valve 69 and may pass through the by-pass 69 into the pressure chamber 78, thus having access to the outer face of the smaller piston 63.

On account of the differential diameters of the pistons this latter pressure will have no effect until the throttle is closed and the superheated steam pressure in the locomotive steam pipe 13 falls. The superheated steam pressure fills the pressure chamber 78 and acts to close the condensation check 79 which is normally raised by its spring upwardly from its seat, as shown in Figure 4. The position shown in Figure 3 will obtain as long as the throttle is open and the drifting valve will remain closed throughout normal running of the locomotive under steam.

The operation of the parts when the throttle valve is closed is as follows:—

This position of the parts is shown in Figure 4. When the throttle is closed steam in the outer portion of the larger cylinder 66 exhausts through the pipe 67. The steam trapped in the chamber 78 by the non-return check valve 69 moves both pistons 63 and 65 and the piston rod 62 to the left until the valve face 77 on the piston rod encounters, and closes against, the valve seat 76. Such movement of the parts causes the stem 58 of the air inlet valve 53 to ride up on the cam section 61 of the piston rod 62 to the high point of the cam, thus opening the air inlet valve 53 and air exhaust valve 57 drops to the low portion of cam closing the exhaust port 56. Air now passes from the pipe 29 through the casing 52 to the pipe 48 and to the drifting valve bellows 43 expanding the bellows and lifting the drifting valve 34 off its seat against the action of the boiler pressure above the valve.

Boiler steam is now free to pass directly from the dome 14 to the steam chest and cylinders of the locomotive through the pipe 49 and the cross pipe 50. In this position port 72 in the larger cylinder 66 is uncovered by the larger piston 65 and steam from the pipe 71 passes into and fills the space between the inner face of the piston 65 and the inner cover or head of the larger cylinder 66, the amount of pressure being controlled by the load on the check valve 74. No steam can escape past the shoulder or valve 77 on the piston rod 62 since the pressure on the inner face of the piston 65 holds this valve face 77 firmly to the steam tight fit against seat 76. The port 70 is sealed by the piston 65, while the port 81 in the smaller cylinder 64 is uncovered, allowing steam in the pressure chamber 78 to escape and the condensation check valve 79 to open.

The operation when the locomotive slows down is as follows:—

As the locomotive slows down preparatory to stopping, the amount of steam supplied to the locomotive steam chests and cylinders by the drifting valve is greater than can be worked off by the slowly moving locomotive valves and pistons.

Consequently pressure builds up in the steam pipe 13, pipe 67 and outer portion of the larger cylinder 66. When pressure on the outer face of the piston 65 exceeds the pressure on the inner face as controlled by the pressure check valve 74, the piston 65 will move to the right, or to the position shown in Figure 3, unseating the piston rod valve face 77 and releasing steam to the right of piston 65 through the exhaust ports 75. This movement permits closing of the air inlet valve 53 and it opens the air exhaust valve 57. Air pressure in the bellows 43 is evacuated down pipe 48 and out through passage 56 to the atmosphere. The boiler pressure in chamber 36 forces drifting valve 34 to close. The last stroke or two of the locomotive main pistons exhausts whatever steam remains in the steam pipe 13, and, when the locomotive comes to a complete stop, the locomotive steam chests and cylinders are entirely free of steam.

When the engine is placed in the terminal and the cylinder cocks are opened by closing the air valve 31 in the cab, the air pressure is automatically shut off from the control valve and the drifting valve becomes inoperative, so that there is no likelihood of the drifting valve supplying steam to the locomotive which might cause the locomotive to "walk off". This forms a safety feature.

It is obvious that various changes and modifications may be made in the details of construction and design of the above specifically described embodiment of this invention without departing from the spirit thereof, such changes and modifications being restricted only by the scope of the following claims:—

What is claimed is:—

1. In a locomotive having a source of compressed air supply, a normally closed drifting valve for controlling the flow of boiler steam to the locomotive steam chests and cylinders, an air pressure device for opening said drifting valve in controlled communication with the air source, a normally closed air inlet valve between said source and device, an air exhaust valve seated by the air pressure in said device, said air inlet valve and air exhaust valve having stems disposed in proximity to one another, and a control device including spaced pistons, a connecting rod connecting the pistons together and having cam portions for engaging said rods, said cam portions having their low points together and their high points apart whereby to open and close the air inlet and air exhaust valves in reverse relation.

2. In a locomotive having a source of compressed air supply, a normally closed drifting valve for controlling the flow of boiler steam to the locomotive steam chests and cylinders, an air pressure device for opening said drifting valve in controlled communication with the air source, a normally closed air inlet valve between said source and device, an air exhaust valve for evacuating the pressure from said device, and control means comprising differential cylinders, pistons of differential diameters therein, means for placing the outer portion of the larger cylinder in communication with the steam chest pressure, a by-pass connecting the outer portions of both cylinders, and a piston rod connecting said pistons and disposed at right angles to said air inlet and exhaust valves and having cam portions for engaging the stems of said air inlet and air exhaust valves.

3. In a locomotive having a source of compressed air supply, a normally closed drifting valve for controlling the flow of boiler steam to the locomotive steam chests and cylinders, an air pressure device for opening said drifting valve in controlled communication with the air source, a normally closed air inlet valve between said source and device, an air exhaust valve for evacuating said device, and control means comprising large and small cylinders disposed on an axis at right angles to the axes of the air inlet and exhaust valves, large and small pistons in said cylinders, a piston rod connecting said pistons and having cam portions thereon for engaging the valve stems of said air inlet and air exhaust valves, means placing the outer portion of the larger cylinder in communication with the steam chest pressure, a by-pass connecting the outer portions of both cylinders, a non-return check in said by-pass for preventing back flow from the smaller to the larger cylinder, said smaller cylinder having an evacuation port unmasked by the smaller piston in the drifting position.

4. In a locomotive having a source of compressed air supply, a normally closed drifting valve for controlling the flow of boiler steam to the locomotive steam chests and cylinders, an air pressure device for opening said drifting valve in controlled communication with the air source, a normally closed air inlet valve between said source and device, an air exhaust valve for evacuating said device, and control means comprising small and large cylinders, small and large pistons therein, a piston rod connecting said pistons and disposed across the ends of the stems of their air inlet and exhaust valves and having cam portions for engaging the stems of said air inlet and air exhaust valves, means for placing the outer portion of the larger cylinder in communication with the steam chest pressure, a by-pass connecting the outer portions of both cylinders, a non-return check in said by-pass for preventing back flow from the smaller to the larger cylinder, said smaller cylinder having an evacuation port normally masked by the smaller piston but opened in the drifting position of said smaller piston, and means placing the inner portion of the larger cylinder in communication with the steam chest pressure.

5. In a locomotive having a source of compressed air supply, a normally closed drifting valve for controlling the flow of boiler steam to the locomotive steam chests and cylinders, an air pressure device for opening said drifting valve in controlled communication with the air source, a normally closed air inlet valve between said source and device, an air exhaust valve for evacuating said device, and control means comprising small and large cylinders, small and large pistons therein, a piston rod connecting said pistons and having cam portions between the ends thereof for engaging the stems of said air inlet and air exhaust valves, means for placing the outer portion of the larger cylinder in communication with the steam chest pressure, a by-pass connecting the outer portions of both cylinders, a non-return check in said by-pass for preventing back flow from the smaller to the larger cylinder, said smaller cylinder having an evacuation port normally masked by the smaller piston but opened in the drifting position of said smaller piston, said larger cylinder having a port normally masked by the larger piston but uncovered in the drifting position of the larger piston, means for communicating the outer end of the larger cylinder with the steam chest pressure to control movements of the larger piston by pressure in the steam chest, and a variable loaded valve for controlling evacuation of pressure from the inner portion of the larger cylinder.

6. In a locomotive having a source of compressed air supply, cylinder cocks, pipe connections from the air source to said cylinder cocks, a normally closed drifting valve for controlling the flow of boiler steam to the locomotive steam chests and cylinders, an air pressure device for opening said drifting valve in controlled communication with the air source, a normally closed air inlet valve between said source and device, an air exhaust valve for evacuating said device, control means comprising small and large cylinders, small and large pistons therein, a piston rod connecting said pistons and having cam portions between the ends thereof for engaging the stems of said air inlet and air exhaust valves, means for placing the outer portion of the larger cylinder in communication with the steam chest pressure, a by-pass connecting the outer portions of both cylinders, a non-return check in said by-pass for preventing back flow from the smaller to the larger cylinder, said smaller cylinder having an evacuation port normally masked by the smaller piston but opened in the drifting position of said smaller piston, said larger cylinder having a port in its side wall in communication with the steam chest pressure and normally masked by said larger piston but uncovered in the drifting position of the larger piston when the cylinder cocks are open, a variable loaded valve for controlling the exhaust of pressure from the inner portion of the larger cylinder, said larger cylinder also having a port for free evacuation of the inner portion thereof, said piston rod having means for closing said last mentioned port in the drifting position of the parts.

7. In a locomotive having a source of compressed air supply, a normally closed drifting valve for controlling the flow of boiler steam to the locomotive steam chests and cylinders, an air pressure device for opening said drifting valve in controlled communication with the air source, a normally closed air inlet valve between said source and device, an air exhaust valve for evacuating said device, control means comprising small and large cylinders, small and large pistons therein, a piston rod connecting said pistons and having cam portions between the ends thereof for engaging the stems of said air inlet and air exhaust valves, means for placing the outer portion of the larger cylinder in communication with the steam chest pressure, a by-pass connecting the outer portions of both cylinders, a non-return check in said by-pass for preventing back flow from the smaller to the larger cylinder, said smaller cylinder having an evacuation port normally masked by the smaller piston but opened in the drifting position of said smaller piston, said larger cylinder having a port in its side wall in communication with the steam chest pressure and leading to the outer side of the smaller piston, said port being normally masked by the larger piston but uncovered in the drifting position of the larger piston, an inner head for said larger cylinder having an evacuation port extending about the piston rod and having a valve seat about said evacuation port, said piston rod having a valve face adapted to take against said valve seat in the drifting position of the parts, a second evacuation port for the inner portion of the larger cylinder, and a spring loaded check valve for controlling exhaust through the last mentioned evacuation port.

8. In a locomotive having a source of compressed air supply, cylinder cocks, pipe connections from the air source to said cylinder cocks, a cab valve for governing the supply of air to the cylinder cocks, means associated with the cylinder cocks for closing said cylinder cocks when the air pressure is turned on, a drifting valve for regulating the supply of boiler steam to the locomotive steam chests normally closed by the boiler steam pressure, an air pressure device for opening said drifting valve, by-pass connections for placing said device in the air line to said cylinder cocks, a normally closed air inlet valve for controlling the supply of air to said device, and control means in communication with the steam chest pressure for regulating the opening and closing of said air inlet valve whereby to open the air inlet valve in the drifting position of the locomotive and to permit it to close at all other times, said control means including spaced cylinders, pistons slidable in said cylinders, and a unitary connecting rod connecting the pistons together and having intermediate cam portions engageable by said inlet valve for opening or closing thereby.

9. In a locomotive, air closed cylinder cocks, an air line to said cylinder cocks, a cab valve for the air line, a normally closed drifting valve openable to permit flow of boiler steam to the locomotive steam chests, an air pressure device for opening said drifting valve, pipe connections from said device to the cylinder cock air line, a normally closed air inlet valve for regulating the supply of air to said device, an exhaust air valve for controlling the evacuation of air from said device, and control means movable by the presence and absence of superheated steam pressure in the steam chests for opening and closing said air inlet and air exhaust valves, said control means including spaced cylinders, pistons slidable in said cylinders, and a unitary connecting rod connecting the pistons together and having intermediate cam portions engageable by said inlet valve for opening or closing thereby.

10. In a locomotive having a source of compressed air supply, a normally closed drifting valve for controlling the flow of boiler steam to the locomotive steam chests and cylinders, normally open cylinder cocks for the locomotive cylinders, an air pressure device for opening said drifting valve in controlled communication with the air source, a controlled branch connection between the air source and the cylinder cocks for closing the latter when the drifting valve is open, a normally closed air inlet valve between said source and device, and control means for opening said air inlet valve only when the locomotive is drifting with the throttle closed, said control means including spaced cylinders, pistons slidable in said cylinders, and a unitary connecting rod connecting the pistons together and having intermediate cam portions engageable by said inlet valve for opening or closing thereby.

11. In a locomotive having a source of compressed air supply, a normally closed drifting valve for controlling the flow of boiler steam to the locomotive steam chests and cylinders, an air pressure device for opening said drifting valve in controlled communication with the air source, normally open cylinder cocks for the locomotive cylinders in controlled communication with the air source, a normally closed air inlet valve between said source and device, a normally closed air exhaust valve for evacuating pressure from said device, control means for alternately opening and permitting the closing of said air inlet valve and said air exhaust valve, and steam chest pressure means operable on said control means to regulate the operation of the drifting valve, said control means including spaced cylinders, pistons slidable in said cylinders, and a unitary connecting rod connecting the pistons together and having intermediate cam portions engageable by said inlet valve for opening or closing thereby.

12. In a locomotive having a source of compressed air supply, a normally closed drifting valve for controlling the flow of boiler steam to the locomotive steam chests and cylinders, an air pressure device for opening said drifting valve in controlled communication with the air source, a normally closed air inlet valve between said source and device, an air exhaust valve biased to a closed position for evacuating the air from said device, cylinder cocks in said controlled communication with the air source, and control means having a movable part with cam portions for engaging the stems of said air inlet valve and air exhaust valve to open and close the valves in reverse relation and having valve parts communicating with the steam chest pressure for controlling the control means, said control means including spaced cylinders, pistons slidable in said cylinders, and a unitary connecting rod connecting the pistons together and having intermediate cam portions engageable by said inlet valve for opening or closing thereby.

CHARLES STERN.